United States Patent
Lee et al.

(10) Patent No.: US 12,174,353 B2
(45) Date of Patent: Dec. 24, 2024

(54) OPTICAL IMAGING SYSTEM

(71) Applicant: SAMSUNG ELECTRO-MECHANICS CO., LTD., Suwon-si (KR)

(72) Inventors: Tae Youn Lee, Suwon-si (KR); Jin Hwa Jung, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/313,448

(22) Filed: May 8, 2023

(65) Prior Publication Data

US 2023/0273408 A1   Aug. 31, 2023

Related U.S. Application Data

(63) Continuation of application No. 17/078,420, filed on Oct. 23, 2020, now Pat. No. 11,681,124, which is a (Continued)

(30) Foreign Application Priority Data

May 4, 2017   (KR) .................. 10-2017-0056769
Jul. 5, 2017   (KR) .................. 10-2017-0085397

(51) Int. Cl.
*G02B 9/64*   (2006.01)
*G02B 9/60*   (2006.01)
(Continued)

(52) U.S. Cl.
CPC ........... *G02B 13/0045* (2013.01); *G02B 9/60* (2013.01); *G02B 13/02* (2013.01)

(58) Field of Classification Search
CPC ...... G02B 13/0045; G02B 13/02; G02B 9/60; G02B 13/18
See application file for complete search history.

(56) References Cited

U.S. PATENT DOCUMENTS

2013/0050847 A1* 2/2013 Hsu .................. G02B 9/60
                                                          359/714
2014/0204480 A1   7/2014 Jo et al.
(Continued)

FOREIGN PATENT DOCUMENTS

CN    101162286 A    4/2008
CN    104765129 A    7/2015
(Continued)

OTHER PUBLICATIONS

Korean Office Action issued on Mar. 22, 2018 in counterpart Korean Patent Application No. 10-2017-0085397 (12 pages, in Korean with English translation).

(Continued)

*Primary Examiner* — Joseph P Martinez
(74) *Attorney, Agent, or Firm* — NSIP Law

(57) ABSTRACT

An optical imaging system includes a first lens, a second lens, a third lens, a fourth lens, and a fifth lens sequentially disposed from the first lens to the fifth lens from an object-side of the imaging system to an image-side of the imaging system and each having refractive power. The fourth lens has a convex object-side surface and an expression 0.7<TL/f<1.0 is satisfied, where TL is a distance from an object-side surface of the first lens to an imaging plane, and f is an overall focal length of the optical imaging system.

10 Claims, 13 Drawing Sheets

Related U.S. Application Data continuation of application No. 15/892,947, filed on Feb. 9, 2018, now Pat. No. 10,852,511.

(51) Int. Cl.
*G02B 13/00* (2006.01)
*G02B 13/02* (2006.01)

(56) References Cited

U.S. PATENT DOCUMENTS

| | | |
|---|---|---|
| 2015/0029601 A1 | 1/2015 | Dror et al. |
| 2015/0185436 A1 | 7/2015 | Park |
| 2015/0185442 A1 | 7/2015 | Katsuragi et al. |
| 2016/0033742 A1* | 2/2016 | Huang ............... G02B 27/0025 359/708 |
| 2016/0065813 A1 | 3/2016 | Jo |
| 2017/0023768 A1 | 1/2017 | Hsieh |
| 2017/0059828 A1 | 3/2017 | Sekine et al. |
| 2017/0307850 A1 | 10/2017 | Jhang et al. |

FOREIGN PATENT DOCUMENTS

| | | |
|---|---|---|
| CN | 105372787 A | 3/2016 |
| CN | 106154495 A | 11/2016 |
| CN | 106483637 A | 3/2017 |
| EP | 2 891 912 A1 | 7/2015 |
| JP | 2008-96552 A | 4/2008 |
| JP | 2011-85733 A | 4/2011 |
| JP | 2015-87495 A | 5/2015 |
| KR | 10-2014-0094334 A | 7/2014 |
| KR | 10-2015-0080680 A | 7/2015 |
| WO | WO 2015/041123 A1 | 3/2015 |

OTHER PUBLICATIONS

Korean Office Action issued on Sep. 20, 2018 in corresponding Korean Patent Application No. 10-2017-0085397 (9 pages in English and 5 pages in Korean).

Chinese Office Action issued on Mar. 26, 2020 in counterpart Chinese Patent Application No. 201810352936.9 (11 pages in English and 8 pages in Chinese).

Korean Office Action issued on Nov. 30, 2021 in counterpart Korean Patent Application No. 202011285281.1 (12 pages in English, 11 pages in Korean).

* cited by examiner

| Surface | K | A | B | C | D | E | F | G | H | J |
|---|---|---|---|---|---|---|---|---|---|---|
| S1 | -0.32516 | 9.57984E-03 | -1.73459E-03 | 3.03890E-02 | -8.66120E-02 | 1.35069E-01 | -1.22266E-01 | 5.98250E-02 | -2.26207E-02 | |
| S2 | 0.00000 | 4.45163E-02 | 7.57867E-02 | -5.07028E-02 | 1.35446E+00 | -2.23089E+00 | 2.16582E+00 | 1.13708E+00 | 2.48465E-01 | |
| S3 | 0.00000 | -5.38655E-02 | 2.69123E-01 | 1.82094E-01 | -2.28359E+00 | 1.04741E+01 | -2.28774E+01 | 2.80568E+01 | 1.85632E+01 | 5.14133E+00 |
| S4 | -1.28362 | -2.22602E-01 | 7.03628E-01 | -6.72491E-01 | 4.57387E-03 | 3.35581E+02 | -1.06547E+02 | 1.88289E+02 | -1.77871E+02 | 7.06616E-01 |
| S5 | 0.00000 | -1.12749E-01 | 6.00858E-01 | -2.91640E+00 | 1.67150E-01 | 6.35279E-01 | 1.57197E-02 | 2.42915E-02 | 2.12777E-02 | 8.04688E-01 |
| S7 | -29.57484 | 2.01777E-01 | 3.31868E-01 | -4.54122E+00 | 3.66867E-01 | -1.71409E-02 | 5.01866E-02 | -8.99100E-02 | 9.00248E-02 | -3.85405E-02 |
| S8 | 99.00000 | -3.03553E-01 | 5.81764E-01 | -1.36640E+00 | 2.05773E-00 | -1.90525E-00 | 1.08048E+00 | -3.62802E-01 | 6.57540E-02 | -4.92414E-03 |
| S9 | -40.24827 | 1.42206E-01 | 4.36423E-01 | 9.90985E-01 | 1.22235E-00 | 9.39370E-01 | 4.23805E-01 | 1.22130E-01 | 1.99956E-02 | -1.42356E-03 |
| S10 | 14.27302 | 3.38692E-01 | 7.88516E-01 | 2.11667E+00 | 9.56701E+00 | -5.16592E-01 | 1.77930E-01 | -3.81294E-02 | 4.65221E-03 | -2.47035E-04 |
| S11 | 0.00000 | 1.65054E-01 | 2.08836E-01 | 1.34922E-01 | 5.98093E-02 | -6.77088E-04 | -6.54014E-03 | 2.91747E-03 | -3.49453E-04 | 1.98725E-05 |

FIG. 3

| Surface | k | A | B | C | D | E | F | G | H | J |
|---|---|---|---|---|---|---|---|---|---|---|
| S1 | -0.31623 | 1.15667E-02 | 1.61440E-03 | 1.10365E-02 | -2.80356E-02 | 3.43829E-02 | -2.43451E-02 | 8.41829E-03 | -2.78873E-03 | |
| S2 | 0.00000 | 1.10796E-01 | -1.70242E-01 | -4.21405E-03 | 6.29930E-01 | -1.49273E+00 | 1.90762E+00 | -1.78921E+00 | 1.65585E-01 | |
| S3 | 0.00000 | 1.02685E-03 | -6.38123E-02 | 1.61271E-01 | 1.23892E-01 | -2.17473E+00 | 9.14874E-01 | 1.72355E+00 | -2.22331E+00 | 7.67709E-01 |
| S4 | -0.71149 | -1.10615E-01 | 5.03222E-01 | 3.90361E+00 | 2.24342E-01 | -7.55924E-01 | 1.58984E-01 | -2.02912E-01 | 1.44114E-02 | -4.27869E-01 |
| S6 | 0.00000 | -3.52447E-03 | 9.78430E-02 | -6.35239E-01 | 2.91342E+00 | -8.15189E-01 | 1.79630E-01 | -2.85974E-01 | 2.80390E-01 | -1.18785E-01 |
| S7 | -74.90074 | 1.58470E-03 | 1.71954E-01 | 3.61236E-01 | 2.73838E-01 | 1.20517E-02 | 3.35337E-02 | 5.69742E-02 | 5.39177E-02 | 2.17221E-02 |
| S8 | 99.00000 | -2.38005E-01 | 3.65961E-01 | 1.38443E-01 | 2.16109E+00 | 2.11435E+00 | 1.30161E+00 | -4.93484E-01 | 1.06307E-01 | -1.00369E-02 |
| S9 | -47.34665 | 1.19578E-01 | 4.31553E-01 | 9.91762E-01 | 1.22224E+00 | -9.03635E-01 | 4.23796E-01 | -1.22125E-01 | 1.99982E-02 | -1.42356E-03 |
| S10 | -39.02908 | -2.82341E-01 | 6.70171E-01 | -9.22054E-01 | 7.40360E-01 | -3.63952E-01 | 1.10693E-01 | -2.04275E-01 | 2.12465E-02 | -9.74566E-05 |
| S11 | 0.00000 | -1.59912E-01 | 2.01018E-01 | -1.54680E-01 | 5.50902E-02 | -6.70093E-04 | -6.53994E-03 | 2.31745E-03 | -3.45444E-04 | 1.98725E-05 |

FIG. 6

| Surface | K | A | B | C | D | E | F | G | H | J |
|---|---|---|---|---|---|---|---|---|---|---|
| S1 | -0.31678 | 1.00469E-02 | 2.51386E-03 | 6.03371E-03 | -1.75755E-02 | 2.59202E-02 | -2.36285E-02 | 1.13328E-02 | -2.84549E-03 | |
| S2 | 0.00000 | 4.86316E-02 | 2.70859E-02 | 2.65827E-01 | 7.11011E-01 | 1.16281E+00 | 1.09537E+00 | 5.51761E-01 | 1.14811E-01 | |
| S3 | 0.00000 | 5.12179E-02 | 1.68896E-01 | -2.27564E-01 | 1.15033E-01 | 6.73314E-01 | 2.27974E-01 | 3.37302E+00 | -2.45568E+00 | 7.12112E-01 |
| S4 | -0.69577 | -1.52963E-01 | 6.84791E-01 | -4.14861E+00 | 2.37528E+01 | 8.52340E+01 | 1.91512E+02 | -2.59537E+02 | 1.94252E+02 | -6.11236E+01 |
| S6 | 0.00000 | -7.04985E-02 | 3.08196E-01 | -2.13831E+00 | 1.22645E+02 | -4.35795E-01 | 1.01441E-02 | -1.48757E-01 | 1.24883E-02 | -4.54646E-01 |
| S7 | -47.16078 | 2.11807E-01 | -6.49812E-03 | -3.38124E+00 | 2.97408E+01 | -1.40683E-02 | 4.17713E-02 | -7.35557E-02 | 7.34241E-02 | -3.13223E-02 |
| S8 | 40.00997 | -2.71698E-01 | 4.80340E-03 | 1.07302E-01 | 1.50397E+00 | 1.23079E+00 | 5.47696E-01 | -1.11736E-01 | -8.59245E-04 | 2.59831E-03 |
| S9 | -40.80185 | -1.35194E-01 | 4.35311E-01 | -9.91092E-01 | 1.22229E+00 | -9.09402E-03 | 4.23796E-01 | -1.22128E-01 | 1.99973E-02 | 1.42956E-03 |
| S10 | -13.20459 | -3.14496E-01 | 7.60816E-01 | -1.08242E+00 | 9.28338E-01 | -3.01094E-01 | 1.72413E-01 | -3.69461E-02 | 4.51438E-03 | -2.40549E-04 |
| S11 | 0.00000 | -1.62219E-01 | 2.05896E-01 | -1.54844E-01 | 5.50241E-02 | -6.76682E-04 | -6.54048E-03 | 2.37744E-04 | -3.45447E-04 | 1.98725E-05 |

FIG. 9

| Surface | K | A | B | C | D | E | F | G | H | J |
|---|---|---|---|---|---|---|---|---|---|---|
| S1 | -0.47949 | 7.77132E-03 | 2.90281E-02 | 1.07056E-01 | 2.52172E-01 | -3.34913E-01 | 2.86194E-01 | -1.23537E-01 | 2.14397E-02 | |
| S2 | 0.00000 | 2.38963E-02 | 8.30793E-02 | -3.04515E-01 | 5.15402E-01 | -5.32342E-01 | 3.06621E-01 | -8.85425E-02 | 9.97922E-03 | |
| S3 | 0.00000 | 1.19585E-01 | 3.96696E-01 | -1.20349E+00 | 5.01372E+00 | -7.84872E+00 | 7.90126E+00 | -4.96087E+00 | 1.76813E+00 | -2.71761E-01 |
| S4 | 0.00000 | -4.41899E-01 | 2.06139E+00 | -6.82361E+00 | 1.58678E+01 | -2.49237E+01 | 2.55425E+01 | -1.61926E+01 | 5.71643E+00 | -8.54474E-01 |
| S5 | 0.00000 | -6.07029E-01 | 1.42703E+00 | -2.92240E+00 | 6.82274E+00 | -1.92203E+01 | -6.52302E+01 | 1.03606E+02 | -8.36105E+01 | 2.74938E+01 |
| S6 | -5.02986 | 1.06672E-02 | 9.97272E-02 | -6.22398E-01 | 4.55390E+00 | -1.67632E+01 | 3.55654E+01 | -4.41464E+01 | 2.97623E+01 | -8.41766E+00 |
| S7 | 2.66109 | -7.84208E-02 | 3.61525E-02 | -6.23511E-02 | 2.34119E-01 | -2.73489E-01 | 1.64943E-01 | 5.45170E-02 | 9.39324E-02 | -6.62958E-04 |
| S8 | -60.89310 | 1.01872E-01 | 2.44810E-01 | 2.24938E-01 | -1.38445E-01 | 6.10190E-02 | -1.89366E-02 | 3.76032E-03 | -4.08678E-04 | 1.76637E-05 |
| S9 | -76.76852 | -7.80188E-02 | 1.32203E-01 | -1.54173E-01 | 9.24719E-02 | -2.98367E-02 | 4.91532E-03 | 2.86493E-04 | -1.78103E-05 | 2.16055E-06 |
| S10 | 0.00000 | -1.13987E-01 | 9.78222E-02 | -7.02838E-02 | 3.07696E-02 | -8.44297E-03 | 1.38002E-03 | -2.15225E-04 | 1.97523E-04 | -8.63134E-07 |

FIG. 12

OPTICAL IMAGING SYSTEM

CROSS-REFERENCE TO RELATED APPLICATIONS

This application is a continuation of U.S. patent application Ser. No. 17/078,420 filed on Oct. 23, 2020, now U.S. Pat. No. 11,681,124, which is a continuation of U.S. patent application Ser. No. 15/892,947 filed on Feb. 9, 2018, now U.S. Pat. No. 10,852,511, which claims the benefit under 35 USC 119 (a) of Korean Patent Application No. 10-2017-0056769 filed on May 4, 2017, in the Korean Intellectual Property Office, and Korean Patent Application No. 10-2017-0085397 filed on Jul. 5, 2017, in the Korean Intellectual Property Office, the entire disclosures of which are incorporated herein by reference for all purposes.

BACKGROUND

1. Field

This application relates to a telescopic optical imaging system including five or more lenses.

2. Description of Related Art

Telescopic optical imaging systems capable of capturing images of distant objects may be overly large. For example, the ratio TL/f of the overall length TL of a telescopic optical imaging system to the overall focal length f may be greater than or equal to 1. Thus, it may be difficult to mount such a telescopic optical imaging system in a small electronic device, such as a portable terminal.

The above information disclosed in this Background section is only for enhancement of understanding of the background of the disclosure and therefore it may contain information that does not form any part of the prior art nor what the prior art may suggest to a person of ordinary skill in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, and a fifth lens, sequentially disposed from the first lens to the fifth lens from an object-side of the imaging system to an image-side of the imaging system and each having refractive power. The fourth lens has a convex object-side surface, and an expression $0.7<TL/f<1.0$ is satisfied, where TL is a distance from an object-side surface of the first lens to an imaging plane, and f is an overall focal length of the optical imaging system.

The first lens may have a concave image-side surface. The second lens may have a concave image-side surface. The third lens may have a convex object-side surface. The fourth lens may have a concave image-side surface. The fifth lens may have a convex object-side surface.

The first lens, the third lens, and the fifth lens may have positive refractive power, and the second lens and the fourth lens may have negative refractive power.

A distance from an image-side surface of the third lens to the object-side surface of the fourth lens may be greater than 0.9 mm and less than 1.7 mm.

An expression $0.38<\tan\theta<0.50$ may be satisfied, where $\theta$ is a half angle of view of the optical imaging system.

In another general aspect, an optical imaging system, includes a first lens having positive refractive power, a second lens having negative refractive power, a third lens having positive refractive power, a fourth lens having negative refractive power, and a fifth lens having positive refractive power and a refractive index greater than 1.6 and less than 1.75. The first to fifth lenses are sequentially disposed from an object-side of the optical imaging system to an image-side of the optical imaging system.

The fourth lens may have a convex object-side surface.

An expression $0.7<TL/f<1.0$ may be satisfied, where TL is a distance from an object-side surface of the first lens to an imaging plane, and f is an overall focal length of the optical imaging system.

An expression $|f2/f1|<1.5$ may be satisfied, where f1 is a focal length of the first lens, and f2 is a focal length of the second lens.

An expression $0<f/f3<1.9$ may be satisfied, where f is an overall focal length of the optical imaging system, and f3 is a focal length of the third lens.

An expression $2.0<f/EPD<2.7$ may be satisfied, where f is an overall focal length of the optical imaging system, and EPD is an entrance pupil diameter.

An expression $-1.0<f1G/f2G<-0.1$ may be satisfied, where f1G is a composite focal length of the first lens, the second lens, and the third lens, and f2G is a composite focal length of the fourth lens and the fifth lens.

An expression $TL/2<f1$ may be satisfied, where TL is a distance from an object-side surface of the first lens to the imaging plane, and f1 is a focal length of the first lens.

In another general aspect, an optical imaging system, includes a first lens group and a second lens group. The first lens group includes a first lens, a second lens, and a third lens. A composite focal length of the first lens group is within a range from about 4.5 to about 5.1. The second lens group includes a fourth lens and a fifth lens. A composite focal length of the second lens group is within a range from about −11 to about −6.5. The first to fifth lenses are sequentially disposed from an object-side of the optical imaging system to an image-side of the optical imaging system.

A focal length of the fourth lens may be within a range of about −8.0 to −3.0. A focal length of the fifth lens may be within a range of about 7 to 100.

An overall focal length of the optical imaging system may be within a range of about 5.0 to 6.5. An overall length of the optical imaging system may be within a range of about 5.0 to 5.6. A half angle of view of the optical imaging system may be within a range of about 21 to 31.

Other features and aspects will be apparent from the following detailed description, the drawings, and the claims.

BRIEF DESCRIPTION OF THE DRAWINGS

FIG. 3 is a table listing examples of aspherical surface characteristics of the optical imaging system illustrated in FIG. 1.

FIG. 6 is a table listing examples of aspherical surface characteristics of the optical imaging system illustrated in FIG. 5.

FIG. 9 is a table listing examples of aspherical surface characteristics of the optical imaging system illustrated in FIG. 7.

FIG. 12 is a table listing examples of aspherical surface characteristics of the optical imaging system illustrated in FIG. 10.

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
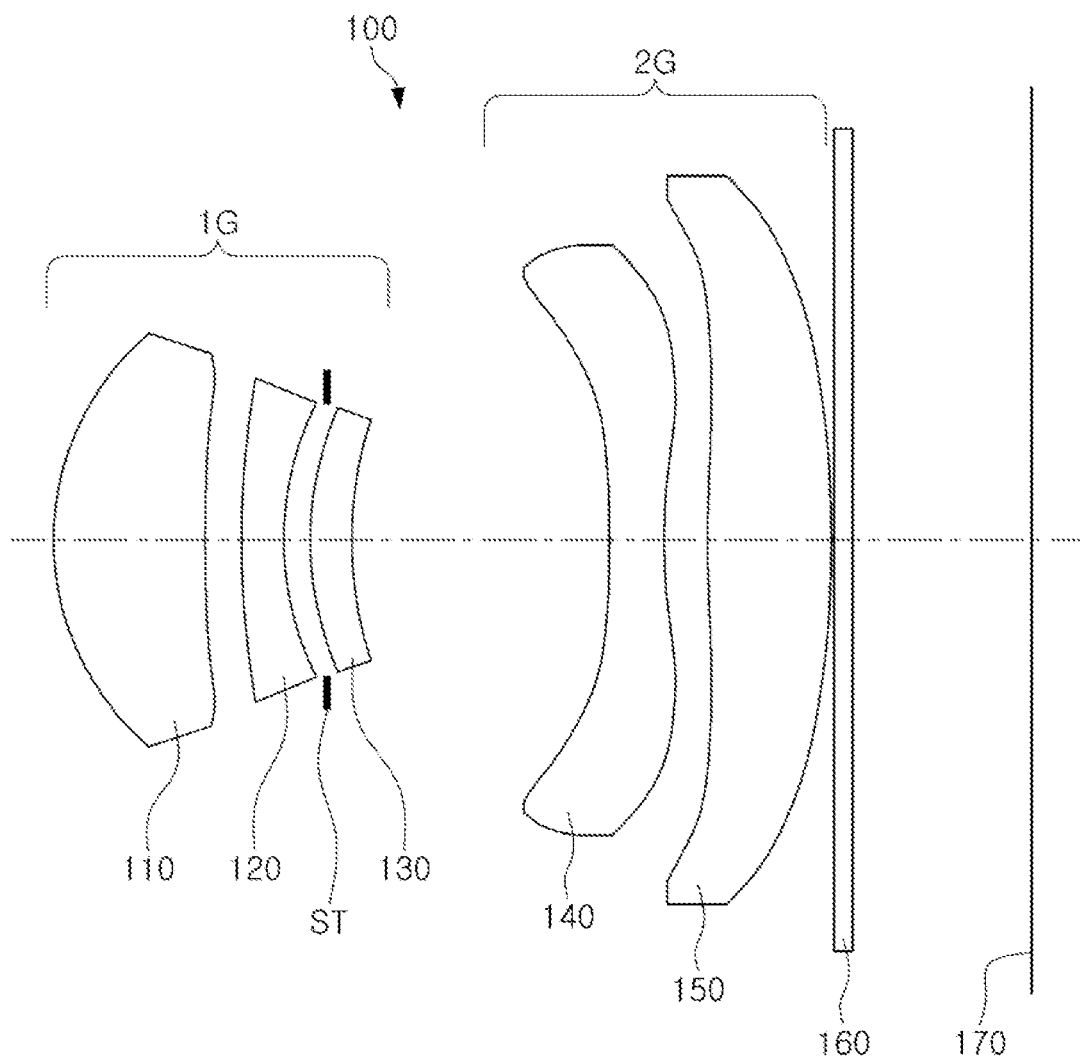
FIG. 1 is a diagram of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

Subsequently, examples are described in further detail with reference to the accompanying drawings.

Examples described in this application provide an optical imaging system capable of being mounted in a small terminal and capturing an image of a distant object.

In this application, a first lens is a lens closest to an object or a subject of which an image is captured. A fifth lens is a lens closest to an imaging plane or an image sensor. In addition, an entirety of a radius of curvature, a thickness, a distance from an object-side surface of a first lens to the imaging plane (TL), a half diagonal length of the imaging plane (IMG HT), and a focal length of a lens are indicated in millimeters (mm). Further, a thickness of a lens, a gap between lenses, and TL are distances measured based on an optical axis of the lens. In a description of a form of a lens, a surface of a lens being convex means that an optical axis portion of a corresponding surface is convex, while a surface of a lens being concave means that an optical axis portion of a corresponding surface is concave. Therefore, in a configuration in which a surface of a lens is described as being convex, an edge portion of the lens may be concave. In a similar manner, in a configuration in which a surface of a lens is described as being concave, an edge portion of the lens may be convex.

Examples described in this application provide an optical imaging system including a first lens group configured to correct an aberration, a second lens group configured to correct curvature of an imaging plane, and a stop interposed between the first lens group and the second lens group.

An example of an optical imaging system includes two lens groups, a first lens group and a second lens group.

The first lens group includes a plurality of lenses. For example, the first lens group includes a first lens having positive refractive power, a second lens having negative refractive power, and a third lens having positive refractive power. The first lens has a convex object-side surface, the second lens has a concave image-side surface, and the third lens has a convex object-side surface.

The first lens group includes an aspherical lens. For example, at least one surface of one of the lenses forming the first lens group may be aspherical. The first lens group may include a plastic lens. For example, all of the lenses forming the first lens group may be manufactured using plastic.

Next, lenses forming the first lens group will be described.

The first lens has positive refractive power. The first lens has a concave image-side surface. The first lens has a refractive index lower than 1.6 and an Abbe number higher than or equal to 50. Opposing surfaces of the first lens may be aspherical. The first lens may be formed using a plastic material.

The second lens has negative refractive power. The second lens has a concave image-side surface. The second lens has a refractive index higher than or equal to 1.65 and an Abbe number less than 23. Opposing surfaces of the second lens may be aspherical. The second lens may be formed using a plastic material.

The third lens has positive refractive power. The third lens has a convex object-side surface. The third lens has a refractive index higher than or equal to 1.60 and an Abbe number less than 23. Opposing surfaces of the third lens may be aspherical. The third lens may be formed using a plastic material.

The second lens group includes a plurality of lenses. For example, the second lens group may include a fourth lens having negative refractive power and a fifth lens having positive refractive power. In this case, the fourth lens may have a convex object-side surface, while the fifth lens may have a convex object-side surface.

The second lens group includes an aspherical lens. For example, at least one surface of one of the lenses forming the second lens group may be aspherical. The second lens group includes a plastic lens. For example, all of the lenses forming the second lens group may be manufactured using plastic.

Next, lenses forming the second lens group will be described.

The fourth lens has negative refractive power. The fourth lens has a convex object-side surface. The fourth lens has a refractive index lower than 1.6 and an Abbe number higher than or equal to 50. Opposing surfaces of the fourth lens may be aspherical. The fourth lens may be formed using a plastic material.

The fifth lens has positive refractive power. The fifth lens has a convex image-side surface. The fifth lens has a refractive index higher than or equal to 1.60 and an Abbe number less than 23. Opposing surfaces of the fifth lens may be aspherical. The fifth lens may be formed using a plastic material.

The optical imaging system is configured to be easily mounted in a small electronic device. For example, an overall length (a distance from the object-side surface of the first lens to the imaging plane) of the optical imaging system is less than or equal to 6.0 mm.

An aspherical surface of a lens in the optical imaging system may be expressed using Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

In Equation 1, c is an inverse number of a radius of curvature of a lens, k is a conic constant, r is a distance from a certain point on an aspherical surface of the lens to an optical axis, A to J are aspherical constants, and Z (or SAG) is a distance between a certain point on the aspherical surface of the lens at the distance r and a tangential plane meeting the apex of the aspherical surface of the lens.

The optical imaging system further includes a filter, an image sensor, and a stop.

The filter is interposed between a lens at the end of the second lens group and the image sensor. The filter is configured to block light having an infrared wavelength. The image sensor forms the imaging plane. The stop is disposed to adjust an intensity of light incident on a lens. The stop may be interposed between the second lens and the third lens. However, a position in which the stop is disposed is not limited to a position between the second lens and the third lens.

The optical imaging system may satisfy the following Conditional Expressions:

$$0.7 < TL/f < 1.0 \quad (1)$$

$$0.9 < d1G2G < 1.7 \quad (2)$$

$$|f2/f1| < 1.5 \quad (3)$$

$$0 < f/f3 < 1.9 \quad (4)$$

$$1.6 < Ndi < 1.75 \quad (5)$$

$$0.38 < \tan\theta < 0.50 \quad (6)$$

$$2.0 < f/EPD < 2.7 \quad (7)$$

$$-1.0 < f1G/f2G < -0.1 \quad (8)$$

$$TL/2 < f1 \quad (9)$$

$$0.4 < D34/D4P < 0.8 \quad (10)$$

$$0.2 < \Sigma TL/fi*f < 1.2 \, (i=1,2,3,4,5) \quad (11)$$

In the above Conditional Expressions, TL is a distance from the object-side surface of the first lens to the imaging plane, f is an overall focal length of the optical imaging system, d1G2G is a distance from an image-side surface of a lens disposed closest to the imaging plane in the first lens group to an object-side surface of a lens disposed closest to an object-side in the second lens group, f2 is a focal length of the second lens, f3 is a focal length of the third lens, f4 is a focal length of the fourth lens, f5 is a focal length of the fifth lens, Ndi is a refractive index of a lens disposed closest to the imaging plane, θ is a half angle of view of the optical imaging system, EPD is an entrance pupil diameter, f1G is a composite focal length of the first lens group, f2G is a composite focal length of the second lens group, D34 is a distance from an image-side surface of the third lens to an object-side surface of the fourth lens, and D4P is a distance from the object-side surface of the fourth lens to the imaging plane.

Satisfying Conditional Expression 1 is a condition for miniaturization of the optical imaging system.

Satisfying Conditional Expression 2 is a design condition to form a telescopic optical system. For example, in the case of the optical imaging system containing components having a value outside of a lower limit value of Conditional Expression 2, an angle of view is relatively wide, and a relatively long focal length is difficult to implement. In the case of the optical imaging system containing components having a value outside of an upper limit value of Conditional Expression 2, an overall length (TL) of the optical imaging system is relatively long, and miniaturization thereof is difficult to realize.

Satisfying Conditional Expression 3 is a focal length ratio of the first lens to the second lens to reduce a telephoto ratio (TL/f).

Satisfying Conditional Expression 4 is a design condition to prevent an image from being degraded. For example, in a case in which the focal length of the third lens is outside of a numerical range of Conditional Expression 4, an image may be degraded due to an increase in astigmatism.

Satisfying Conditional Expression 5 is a design condition of a lens disposed closest to the imaging plane for a high-resolution optical imaging system. For example, in a case in which a refractive index of a lens disposed closest to the imaging plane satisfies a numerical range of Conditional Expression 5, an effect of correcting astigmatism, a chromatic aberration, and a magnification aberration through the lens may be enhanced.

Satisfying Conditional Expression 6 is a condition of an angle of view for a telescopic optical imaging system, while satisfying Conditional Expression 7 is a range of an f-number for a high-resolution optical imaging system.

Satisfying Conditional Expression 8 suggests an appropriate focus ratio between the first lens group for aberration correction of the optical imaging system and the second lens group for curvature correction of the imaging plane.

Hereinafter, the optical imaging system according to various examples will be described.

With reference to FIG. 1, an optical imaging system according to a first example will be described.

An optical imaging system 100 includes a first lens group 1G and a second lens group 2G.

The first lens group 1G includes a first lens 110, a second lens 120, and a third lens 130.

The first lens 110 has positive refractive power, a convex object-side surface, and a concave image-side surface. The second lens 120 has negative refractive power, a convex object-side surface, and a concave image-side surface. The third lens 130 has positive refractive power, a convex object-side surface, and a concave image-side surface.

The second lens group 2G includes a fourth lens 140 and a fifth lens 150.

The fourth lens 140 has negative refractive power, a convex object-side surface, and a concave image-side surface. In addition, the fourth lens 140 has a shape which includes an inflection point on an image-side surface. For example, the image-side surface of the fourth lens 140 may be concave in a vicinity of an optical axis and convex on an edge thereof. The fifth lens 150 has positive refractive power and opposing convex surfaces. In addition, the fifth lens 150 has a shape which includes an inflection point on an object-side surface.

In an example of the optical imaging system, a composite focal length f1G of the first lens group 1G is 4.920, while a composite focal length f2G of the second lens group 2G is −9.510.

The optical imaging system 100 includes an image sensor 170 forming an imaging plane. The optical imaging system 100 includes a filter 160. The filter 160 is interposed between the fifth lens 150 and the image sensor 170. The optical imaging system 100 includes a stop ST. The stop ST may be interposed between the second lens 120 and the third lens 130.

Figure 2:
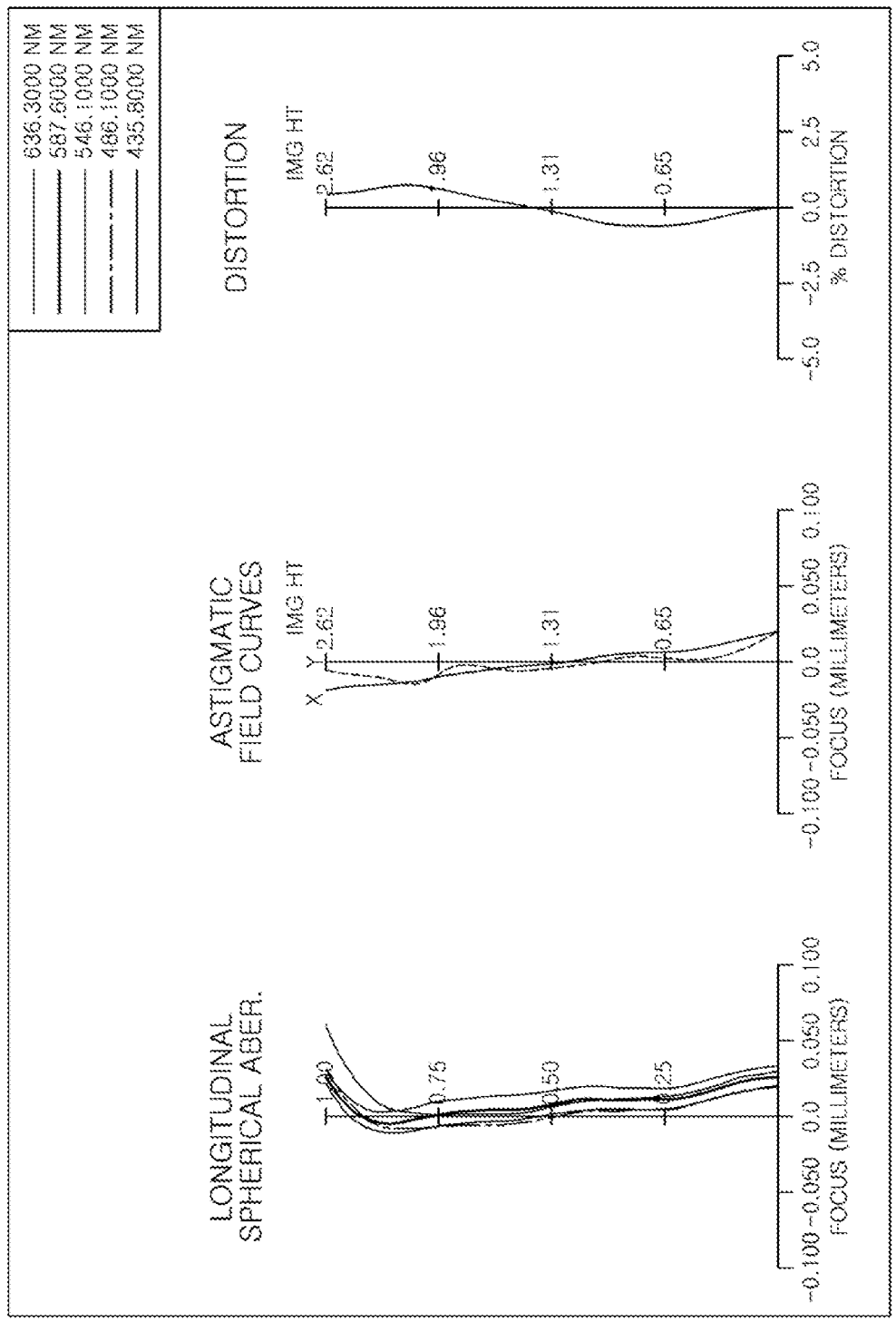
FIG. 2 illustrates examples of aberration curves of the optical imaging system illustrated in FIG. 1.

The optical imaging system 100 configured as described above has aberration characteristics as illustrated in FIG. 2. An image height IMG HT of the optical imaging system 100 according to an example is 2.62 mm as illustrated in FIG. 2. FIG. 3 is a table listing examples of aspherical surface characteristics of the optical imaging system 100. Table 1 illustrates lens characteristics of the optical imaging system 100 according to an example.

TABLE 1

| First Example |
| $\ominus$ = 23.61 f = 6.001 TL = 5.401 | | | | | |
| --- | --- | --- | --- | --- | --- |
| Surface No. | | Radius of Curvature | Thickness/ Distance | Focal Length | Refractive Index | Abbe Number |
| S1 | First | 1.5100 | 0.8470 | 2.890 | 1.544 | 56.100 |
| S2 | Lens | 27.99 | 0.1960 | | | |
| S3 | Second | 7.140 | 0.2300 | −3.160 | 1.661 | 20.300 |
| S4 | Lens | 1.6100 | 0.0710 | | | |
| S5 | Stop | infinity | 0.0710 | | | |
| S6 | Third | 2.130 | 0.2300 | 10.000 | 1.650 | 21.500 |
| S7 | Lens | 3.0200 | 1.4170 | | | |
| S8 | Fourth | 68.3700 | 0.3100 | −4.020 | 1.544 | 56.100 |
| S9 | Lens | 2.1300 | 0.2410 | | | |
| S10 | Fifth | 5.0900 | 0.6670 | 7.400 | 1.650 | 21.500 |
| S11 | Lens | −105.8000 | 0.0200 | | | |
| S12 | Filter | infinity | 0.1100 | | 1.523 | 39.10 |

TABLE 1-continued

| First Example |
| $\ominus$ = 23.61 f = 6.001 TL = 5.401 | | | | | |
| --- | --- | --- | --- | --- | --- |
| Surface No. | | Radius of Curvature | Thickness/ Distance | Focal Length | Refractive Index | Abbe Number |
| S13 | | infinity | 0.9910 | | | |
| S14 | Imaging Plane | infinity | 0.0000 | | | |

Figure 4:
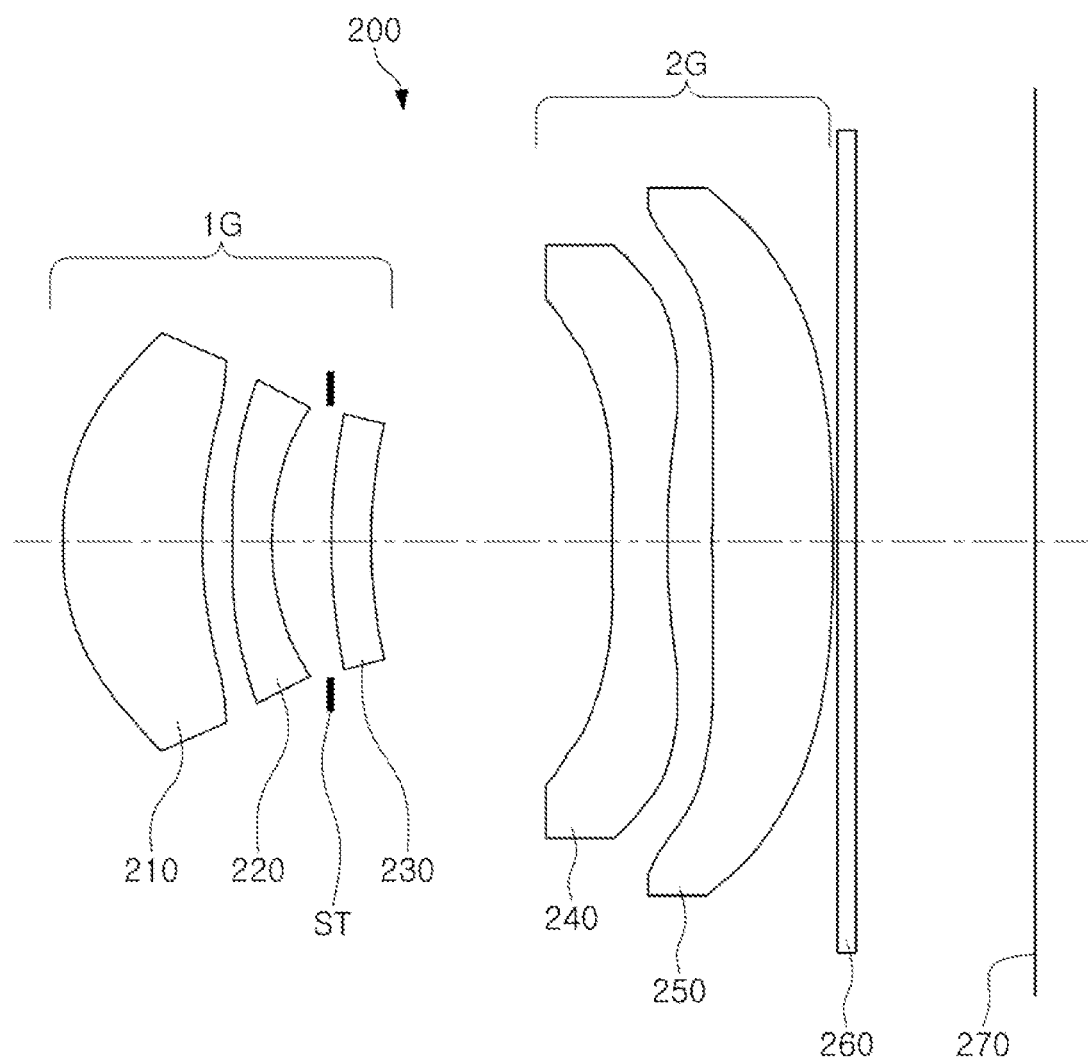
FIG. 4 is a diagram of an optical imaging system according to a second example.

A second example of an optical imaging system will be described with reference to FIG. 4.

The second example of an optical imaging system 200 includes a first lens group 1G and a second lens group 2G.

The first lens group 1G includes a first lens 210, a second lens 220, and a third lens 230.

The first lens 210 has positive refractive power, a convex object-side surface, and a concave image-side surface. The second lens 220 has negative refractive power, a convex object-side surface, and a concave image-side surface. The third lens 230 has positive refractive power, a convex object-side surface, and a concave image-side surface.

The second lens group 2G includes a fourth lens 240 and a fifth lens 250.

The fourth lens 240 has negative refractive power, a convex object-side surface, and a concave image-side surface. In addition, the fourth lens 240 has a shape including an inflection point on an image-side surface. For example, the image-side surface of the fourth lens 240 may be concave in a vicinity of an optical axis and convex on an edge thereof. The fifth lens 250 has positive refractive power and opposing convex surfaces. In addition, the fifth lens 250 has a shape including an inflection point on an object-side surface.

In the optical imaging system according to an example, a composite focal length f1G of the first lens group 1G is 4.960, while a composite focal length f2G of the second lens group 2G is −10.08.

The optical imaging system 200 includes an image sensor 270 forming an imaging plane. The optical imaging system 200 includes a filter 260. The filter 260 is interposed between the fifth lens 250 and the image sensor 270. The optical imaging system 200 includes a stop ST. The stop ST is interposed between the second lens 220 and the third lens 230.

Figure 5:
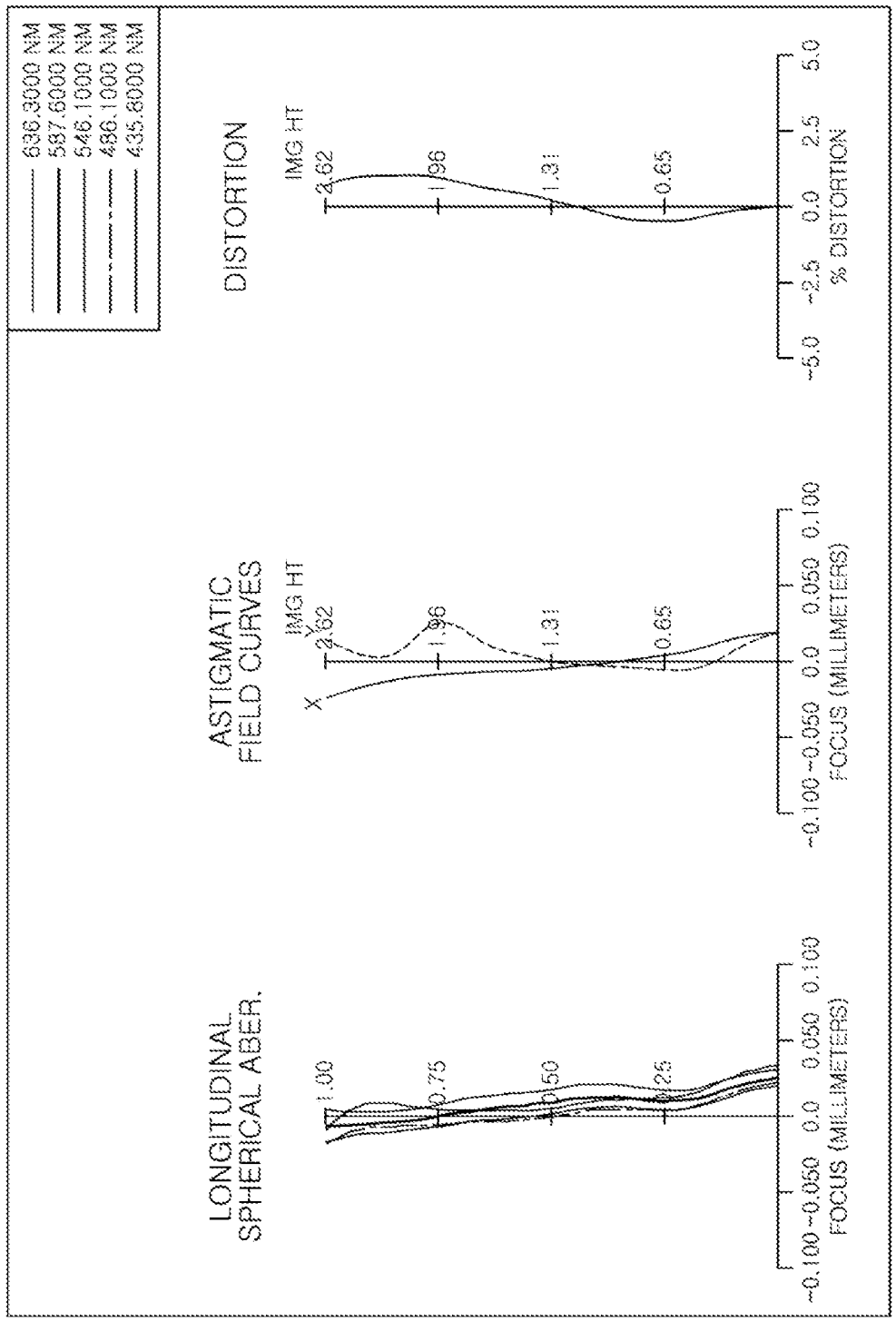
FIG. 5 illustrates examples of aberration curves of the optical imaging system illustrated in FIG. 4.

The optical imaging system 200 configured as described above has aberration characteristics as illustrated in FIG. 5. An image height IMG HT of the optical imaging system 200 according to an example is 2.62 mm as illustrated in FIG. 5. FIG. 6 is a table listing examples of aspherical surface characteristics of the optical imaging system 200. Table 2 illustrates lens characteristics of the optical imaging system 200 according to an example.

TABLE 2

| Second Example |
| $\ominus$ = 23.51 f = 6.000 TL = 5.400 | | | | | |
| --- | --- | --- | --- | --- | --- |
| Surface No. | | Radius of Curvature | Thickness/ Distance | Focal Length | Refractive Index | Abbe Number |
| S1 | First | 1.4800 | 0.8900 | 2.850 | 1.544 | 56.100 |
| S2 | Lens | 23.45 | 0.0700 | | | |
| S3 | Second | 3.150 | 0.2300 | −4.250 | 1.661 | 20.300 |
| S4 | Lens | 1.4500 | 0.1000 | | | |
| S5 | Stop | infinity | 0.2410 | | | |
| S6 | Third | 4.330 | 0.2300 | 166.430 | 1.650 | 21.500 |
| S7 | Lens | 4.4100 | 1.3690 | | | |
| S8 | Fourth | 1883.6400 | 0.3100 | −4.400 | 1.544 | 56.100 |

TABLE 2-continued

Second Example
Θ = 23.51 f = 6.000 TL = 5.400

| Surface No. | | Radius of Curvature | Thickness/ Distance | Focal Length | Refractive Index | Abbe Number |
|---|---|---|---|---|---|---|
| S9 | Lens | 2.4000 | 0.2590 | | | |
| S10 | Fifth | 6.6900 | 0.6870 | 8.400 | 1.650 | 21.500 |
| S11 | Lens | −30.3900 | 0.0200 | | | |
| S12 | Filter | infinity | 0.1100 | | 1.520 | 39.070 |
| S13 | | infinity | 0.8840 | | | |
| S14 | Imaging Plane | infinity | 0.0000 | | | |

Figure 7:
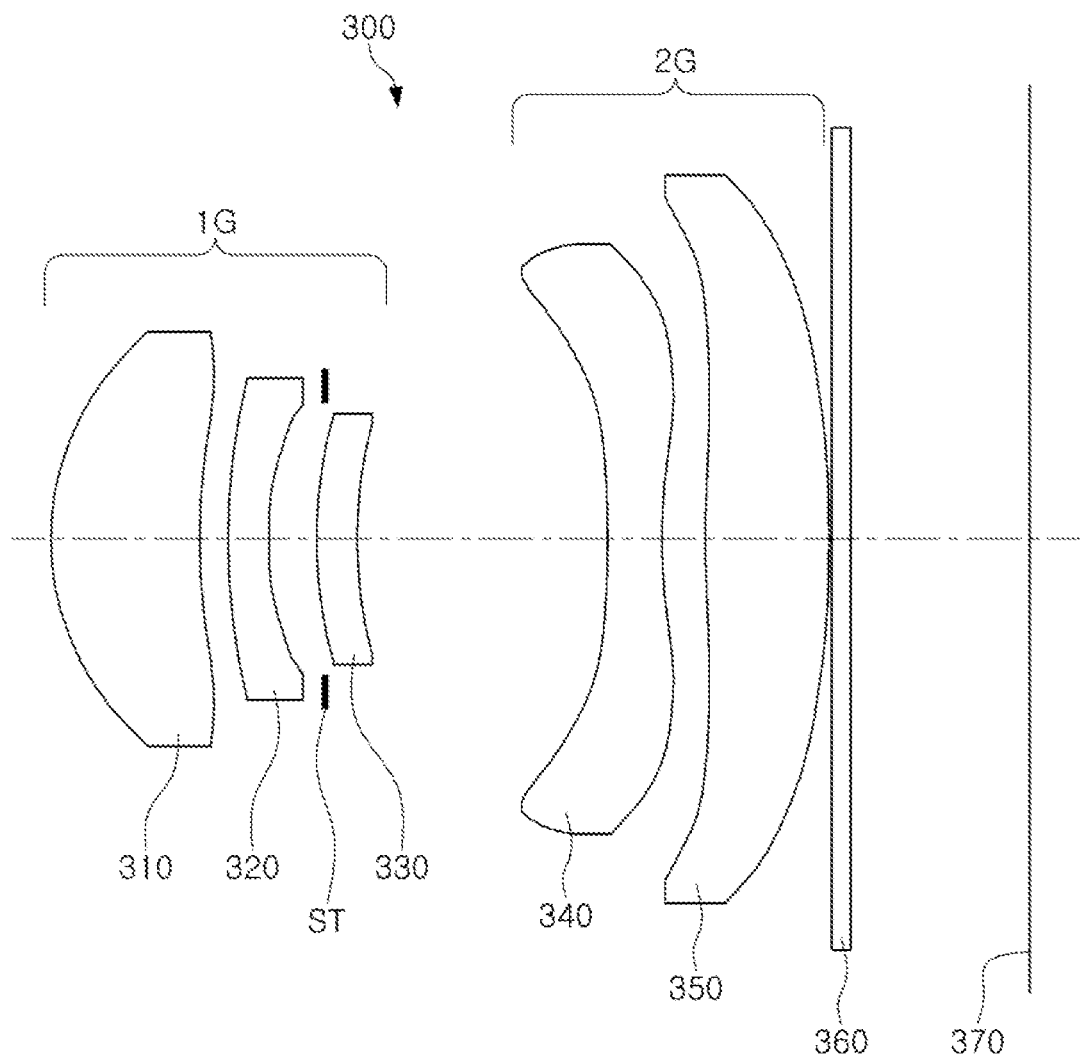
FIG. 7 is a diagram of an optical imaging system according to a third example.

An optical imaging system according to a third example will be described with reference to FIG. 7.

The third example of an optical imaging system 300 includes a first lens group 1G and a second lens group 2G.

The first lens group 1G includes a first lens 310, a second lens 320, and a third lens 330.

The first lens 310 has positive refractive power, a convex object-side surface, and a concave image-side surface. The second lens 320 has negative refractive power, a convex object-side surface, and a concave image-side surface. The third lens 330 has positive refractive power, a convex object-side surface, and a concave image-side surface.

The second lens group 2G includes a fourth lens 340 and a fifth lens 350.

The fourth lens 340 has negative refractive power, a convex object-side surface, and a concave image-side surface. In addition, the fourth lens 340 has a shape which includes an inflection point on an image-side surface. For example, the image-side surface of the fourth lens 340 may be concave in a vicinity of an optical axis and convex on an edge thereof. The fifth lens 350 has positive refractive power and opposing convex surfaces. In addition, the fifth lens 350 has a shape which includes an inflection point on an object-side surface.

In the optical imaging system according to an example, a composite focal length f1G of the first lens group 1G is 4.960, while a composite focal length f2G of the second lens group 2G is −9.630.

The optical imaging system 300 includes an image sensor 370 forming an imaging plane. The optical imaging system 300 includes a filter 360. The filter 360 is interposed between the fifth lens 350 and the image sensor 370. The optical imaging system 300 includes a stop ST. The stop ST is interposed between the second lens 320 and the third lens 330.

Figure 8:
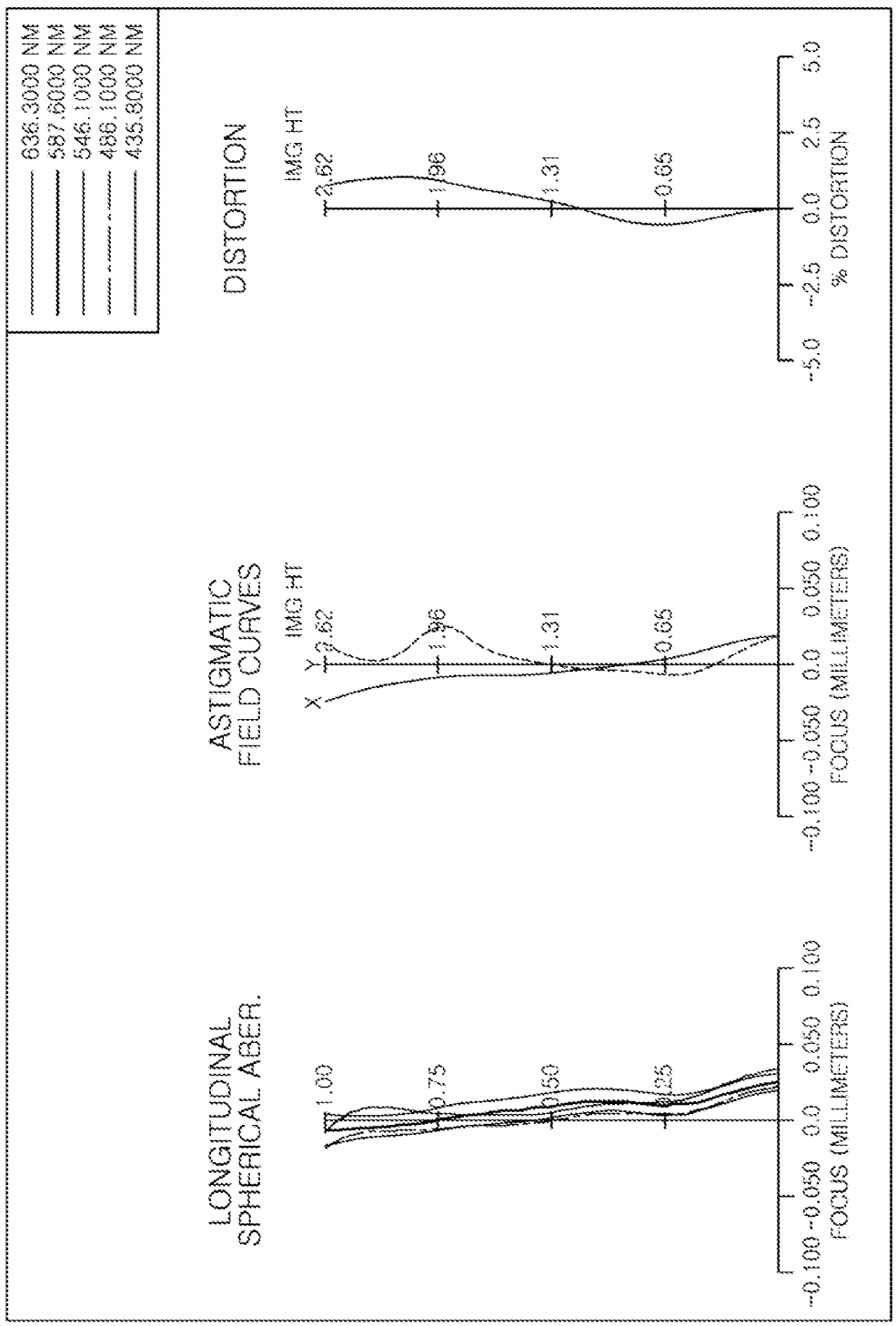
FIG. 8 illustrates examples of aberration curves of the optical imaging system illustrated in FIG. 7.

The optical imaging system 300, configured as described above, has aberration characteristics as illustrated in FIG. 8. An image height IMG HT of the optical imaging system 300 according to an example is 2.62 mm, as illustrated in FIG. 8. FIG. 9 is a table listing examples of aspherical surface characteristics of the optical imaging system 300. Table 3 illustrates lens characteristics of the optical imaging system 100 according to an example.

TABLE 3

Third Example
Θ = 23.56 f = 6.000 TL = 5.400

| Surface No. | | Radius of Curvature | Thickness/ Distance | Focal Length | Refractive Index | Abbe Number |
|---|---|---|---|---|---|---|
| S1 | First | 1.5000 | 0.8850 | 2.920 | 1.544 | 56.100 |
| S2 | Lens | 18.86 | 0.1270 | | | |

TABLE 3-continued

Third Example
Θ = 23.56 f = 6.000 TL = 5.400

| Surface No. | | Radius of Curvature | Thickness/ Distance | Focal Length | Refractive Index | Abbe Number |
|---|---|---|---|---|---|---|
| S3 | Second | 4.540 | 0.2300 | −4.010 | 1.661 | 20.300 |
| S4 | Lens | 1.6500 | 0.1000 | | | |
| S5 | Stop | infinity | 0.1750 | | | |
| S6 | Third | 2.770 | 0.2300 | 30.000 | 1.650 | 21.500 |
| S7 | Lens | 3.1100 | 1.3890 | | | |
| S8 | Fourth | 127.8800 | 0.3100 | −4.160 | 1.544 | 56.100 |
| S9 | Lens | 2.2300 | 0.2380 | | | |
| S10 | Fifth | 5.6100 | 0.6690 | 7.790 | 1.650 | 21.500 |
| S11 | Lens | −56.3900 | 0.0200 | | | |
| S12 | Filter | infinity | 0.1100 | | 1.520 | 39.070 |
| S13 | | infinity | 0.9170 | | | |
| S14 | Imaging Plane | infinity | 0.0000 | | | |

Figure 10:
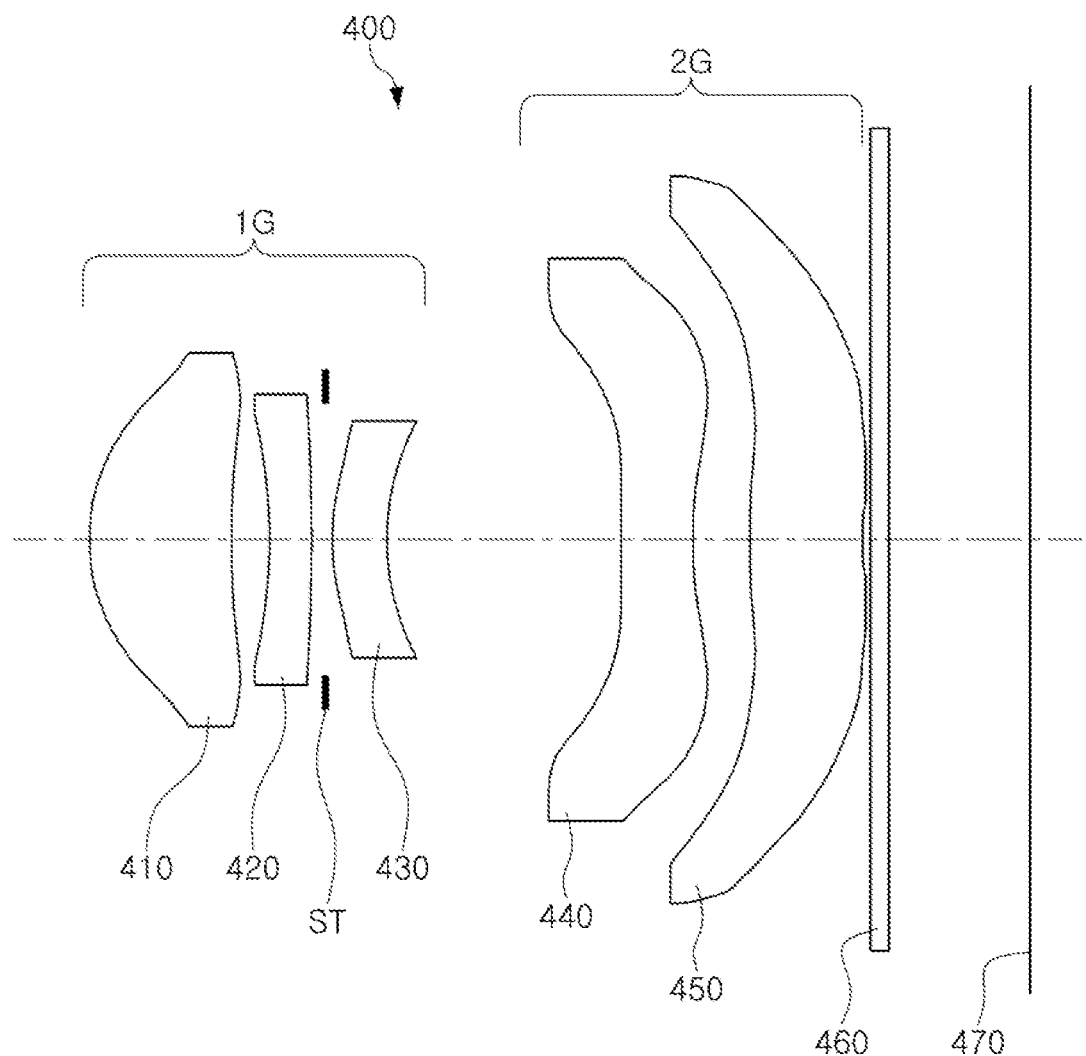
FIG. 10 is a diagram of an optical imaging system according to a fourth example.

An optical imaging system according to a fourth example will be described with reference to FIG. 10.

The fourth example of an optical imaging system 400 includes a first lens group 1G and a second lens group 2G.

The first lens group 1G includes a first lens 410, a second lens 420, and a third lens 430.

The first lens 410 has positive refractive power, a convex object-side surface, and a concave image-side surface. The second lens 420 has negative refractive power, a concave object-side surface, and opposing concave image-side surfaces. The third lens 430 has positive refractive power, a convex object-side surface, and a concave image-side surface.

The second lens group 2G includes a fourth lens 440 and a fifth lens 450.

The fourth lens 440 has negative refractive power, a convex object-side surface, and a concave image-side surface. In addition, the fourth lens 440 has a shape which includes an inflection point on an image-side surface. For example, the image-side surface of the fourth lens 440 may be concave in a vicinity of an optical axis and convex on an edge thereof. The fifth lens 450 has positive refractive power, a convex object-side surface, and a concave image-side surface. In addition, the fifth lens 450 has a shape which includes an inflection point on an object-side surface.

In the optical imaging system according to an example, a composite focal length f1G of the first lens group 1G is 4.608, while a composite focal length f2G of the second lens group 2G is −7.420.

The optical imaging system 400 includes an image sensor 470 forming an imaging plane. The optical imaging system 400 includes a filter 460. The filter 460 is interposed between the fifth lens 450 and the image sensor 470. The optical imaging system 400 includes a stop ST. The stop ST is interposed between the second lens 420 and the third lens 430.

Figure 11:
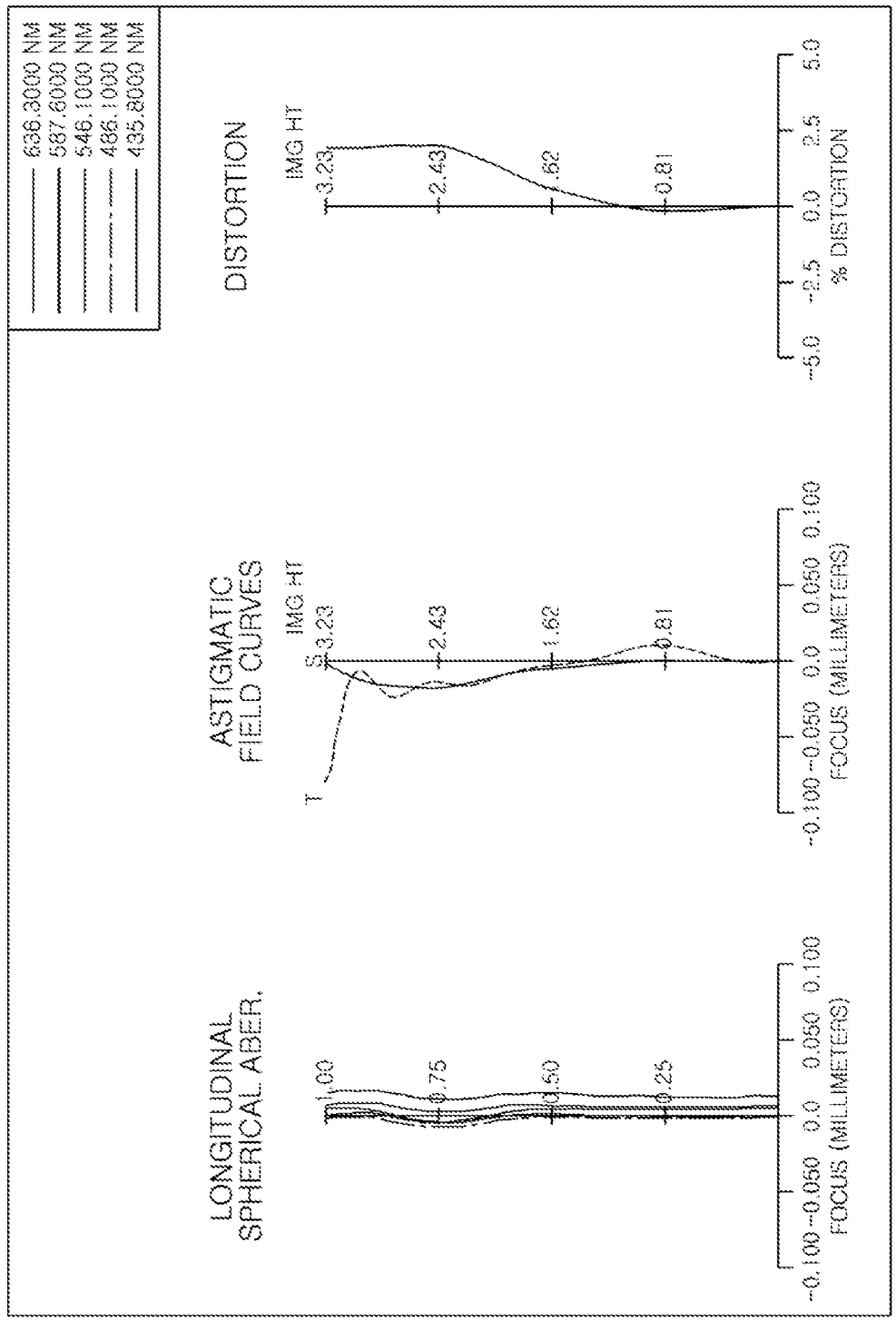
FIG. 11 illustrates examples of aberration curves of the optical imaging system illustrated in FIG. 10.

The optical imaging system 400 configured as described above has aberration characteristics as illustrated in FIG. 11. An image height IMG HT of the optical imaging system 400 according to an example is 3.23 mm as illustrated in FIG. 11. FIG. 12 is a table listing examples of aspherical surface characteristics of the optical imaging system 400. Table 4 illustrates lens characteristics of the optical imaging system 400 according to an example.

TABLE 4

Fourth Example
Θ = 29.98 f = 5.501 TL = 5.281

| Surface No. | | Radius of Curvature | Thickness/ Distance | Focal Length | Refractive Index | Abbe Number |
|---|---|---|---|---|---|---|
| S1 | First | 1.5700 | 0.8050 | 2.930 | 1.544 | 56.100 |
| S2 | Lens | 66.85 | 0.2050 | | | |
| S3 | Second | −2.560 | 0.2300 | −3.380 | 1.661 | 20.400 |
| S4 | Lens | 19.9200 | 0.1170 | | | |
| S6 | Third | 1.540 | 0.3050 | 8.070 | 1.650 | 21.500 |
| S7 | Lens | 2.0000 | 1.3160 | | | |
| S8 | Fourth | 45.6800 | 0.4080 | −6.960 | 1.544 | 56.100 |
| S9 | Lens | 3.5000 | 0.3260 | | | |
| S10 | Fifth | 10.6300 | 0.6350 | 89.420 | 1.661 | 20.400 |
| S11 | Lens | 12.6200 | 0.0340 | | | |
| S12 | Filter | infinity | 0.1100 | | 1.517 | 64.20 |
| S13 | | infinity | 0.7900 | | | |
| S14 | Imaging Plane | infinity | 0.0000 | | | |

Table 5 illustrates values satisfying the Conditional Expressions 1-8, 10, and 11, above, for the optical imaging system according to the first example, the second example, the third example, and the fourth example.

TABLE 5

| Conditional Expression | First Example | Second Example | Third Example | Fourth Example |
|---|---|---|---|---|
| TL/f | 0.900 | 0.900 | 0.900 | 0.960 |
| d1G2G | 1.417 | 1.369 | 1.389 | 1.316 |
| \|f2/f1\| | 1.094 | 1.491 | 1.374 | 1.153 |
| f/f3 | 0.600 | 0.036 | 0.200 | 0.682 |
| Ndi | 1.650 | 1.650 | 1.650 | 1.661 |
| tanθ | 0.437 | 0.435 | 0.436 | 0.577 |
| f/EPD | 2.680 | 2.650 | 2.670 | 2.66 |
| f1G/f2G | −0.517 | −0.493 | −0.515 | −0.621 |
| D34/D4P | 0.606 | 0.603 | 0.614 | 0.571 |
| ΣTL/fi*f < 1.2 (i = 1, 2, 3, 4, 5) | 0.517 | 0.433 | 0.467 | 1.071 |

In the optical imaging system, a focal length of the first lens is generally set to be within a range of 2.8 to 3.0. In the optical imaging system, a focal length of the second lens is generally set to be within a range of −4.5 to −3.0. In the optical imaging system, a focal length of the third lens is generally set to be within a range of 8 to 200. In the optical imaging system, a focal length of the fourth lens is generally set to be within a range of −8.0 to −3.0. In the optical imaging system, a focal length of the fifth lens is generally set to be within a range of 7 to 100. In the optical imaging system, a composite focal length of the first lens group including the first lens, the second lens, and the third lens is set to be within a range of 4.5 to 5.1. In the optical imaging system, a composite focal length of the second lens group including the fourth lens and the fifth lens is set to be within a range of −11 to −6.5.

Focal lengths of lenses forming the optical imaging system are not limited to the ranges described above. For example, focal lengths of the first lens, the second lens, and the third lens may be changed within a range satisfying the range (4.5 to 5.1) with respect to the composite focal length of the first lens group, described above. Focal lengths of the fourth lens and the fifth lens may be changed within a range satisfying the range (−11 to −6.5) with respect to the composite focal length of the second lens group, described above.

An overall focal length of the optical imaging system is generally set to be within a range of 5.0 to 6.5. An overall length TL of the optical imaging system is generally set to be within a range of 5.0 to 5.6. A half angle of view of the optical imaging system is set to be within a range of 21 to 31.

Figure 13:
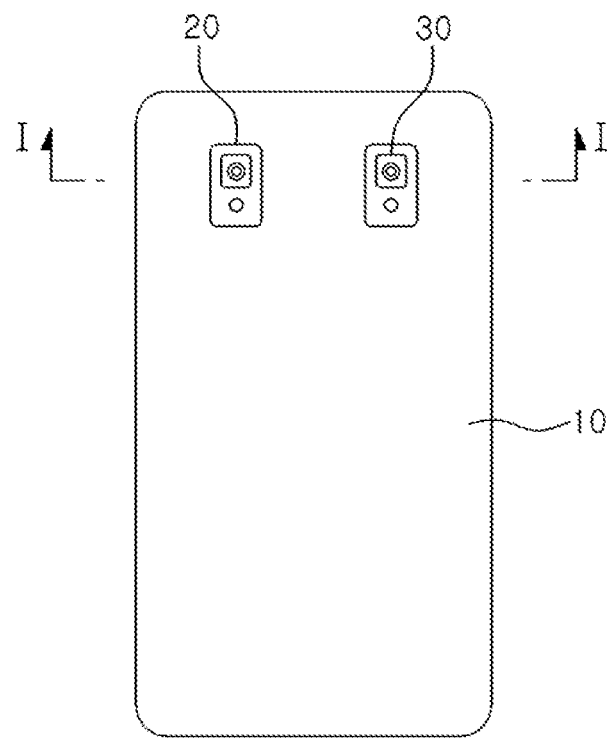
FIG. 13 is a rear view of an example of a portable terminal in which an example of an optical imaging system described in this application is mounted.
Figure 14:
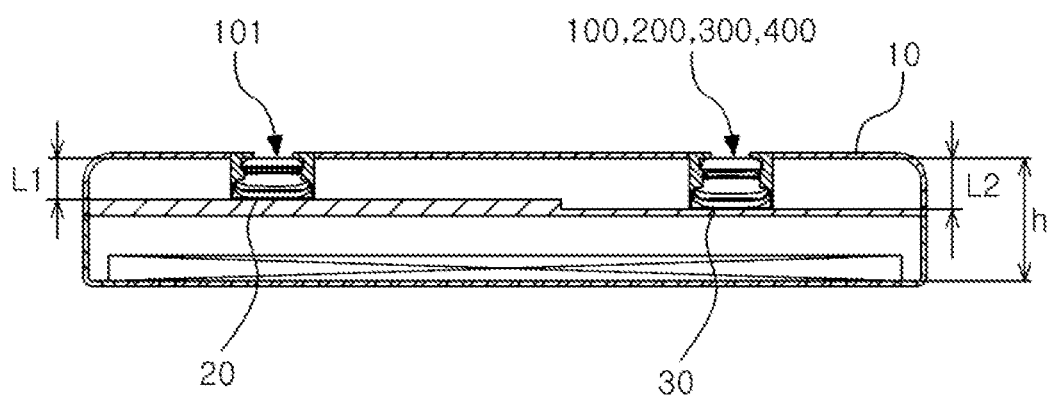
FIG. 14 is a cross-sectional view of the portable terminal illustrated in FIG. 13.

Hereinafter, with reference to FIGS. 13 and 14, an example optical imaging system mounted in a portable terminal is described. FIG. 13 is a rear view of an example of a portable terminal in which an example of an optical imaging system described in this application is mounted. FIG. 14 is a cross sectional view taken along I-I of FIG. 13.

A portable terminal 10 includes a plurality of camera modules, for example, a first camera module 20 and a second camera module 30. The first camera module 20 includes a first optical imaging system 101 configured to image a subject at close range. The second camera module 30 includes second optical imaging systems 100, 200, 300, and 400 configured to image a subject at long range.

The first optical imaging system 101 includes a plurality of lenses. For example, the first optical imaging system 101 includes four or more lenses. The first optical imaging system 101 is configured to capture images of objects at close range. For example, the first optical imaging system 101 has a relatively wide angle of view of 50° or above, while a (TL/f) ratio is equal to or greater than 1.0.

The second optical imaging systems 100, 200, 300, and 400 each include a plurality of lenses. For example, the second optical imaging systems 100, 200, 300, and 400 each include five or more lenses. The second optical imaging systems 100, 200, 300, and 400 may be provided as one of the optical imaging systems from among the example optical imaging systems, according to the first example, the second example, the third example, and the fourth example, described above. The second optical imaging systems 100, 200, 300, and 400 may be configured to capture an image of a distant object. For example, the second optical imaging systems 100, 200, 300, and 400 each have an angle of view of 50° or below, while a (TL/f) ratio is less than 1.0.

The first optical imaging system 101 and the second optical imaging systems 100, 200, 300, and 400 may be substantially equal in size. For example, an overall length L1 of the first optical imaging system 101 can be substantially equal to an overall length L2 of the second optical imaging systems 100, 200, 300, and 400. Alternatively, a ratio (L1/L2) of the overall length L1 of the first optical imaging system 101 to the overall length L2 of any of the second optical imaging systems 100, 200, 300, and 400 may be 0.8 to 1.0. The second optical imaging systems 100, 200, 300, and 400 are each configured to have an overall length L2 less than a height h of the portable terminal 10. For example, a ratio (L2/h) of the overall length L2 of the second optical imaging systems 100, 200, 300, and 400 to the height h of the portable terminal 10 is less than or equal to 0.8. In addition, the overall length L2 of each of the second optical imaging systems 100, 200, 300, and 400 may be less than or equal to 6.5 mm.

As set forth above, according to examples, an optical imaging system capable of capturing a distant image and being mounted in a small terminal may be provided.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit were to be combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
    a first lens comprising a refractive power;
    a second lens comprising a refractive power;
    a third lens comprising a refractive power;
    a fourth lens comprising a refractive power; and
    a fifth lens comprising a concave image-side surface and having a refractive index of 1.6 or greater,
    wherein the first to fifth lenses are sequentially disposed from an object side toward an imaging plane,
    wherein $2.0 < f/EPD < 2.7$, where f is an overall focal length of the optical imaging system and EPD is an entrance pupil diameter,
    wherein an overall length (a distance from an object-side surface of the first lens to the imaging plane) of the optical imaging system is less than or equal to 6.0 mm, and
    wherein a radius of curvature of an image-side surface of the fourth lens is greater than a radius of curvature of an object-side surface of the first lens.

2. The optical imaging system of claim 1, wherein the first lens has a convex object-side surface.

3. The optical imaging system of claim 1, wherein the first lens has a concave image-side surface.

4. The optical imaging system of claim 1, wherein the second lens has a concave image-side surface.

5. The optical imaging system of claim 1, wherein the third lens has a convex object-side surface.

6. The optical imaging system of claim 1, wherein the third lens comprises a concave image-side surface.

7. The optical imaging system of claim 1, wherein the fifth lens has a convex object-side surface.

8. An optical imaging system, comprising:
    a first lens comprising positive refractive power;
    a second lens comprising negative refractive power;
    a third lens comprising positive refractive power;
    a fourth lens comprising a refractive power; and
    a fifth lens comprising a concave image-side surface and having a refractive index of 1.6 or greater,
    wherein the first to fifth lenses are sequentially disposed from an object side toward an imaging plane,
    wherein an overall length (a distance from an object-side surface of the first lens to the imaging plane) of the optical imaging system is less than or equal to 6.0 mm, and
    wherein a radius of curvature of an image-side surface of the fourth lens is greater than a radius of curvature of an object-side surface of the first lens.

9. The optical imaging system of claim 8, wherein $0 < f/f3 < 1.9$, where f is an overall focal length of the optical imaging system and f3 is a focal length of the third lens.

10. The optical imaging system of claim 8, wherein $0.2 < \Sigma TL/fi*f < 1.2$ (i=1, 2, 3, 4, 5), where f is an overall focal length of the optical imaging system, f1 is a focal length of the first lens, f2 is a focal length of the second lens, f3 is a focal length of the third lens, f4 is a focal length of the fourth lens, f5 is a focal length of the fifth lens.

* * * * *